(12) United States Patent
Dürsen et al.

(10) Patent No.: US 12,173,159 B2
(45) Date of Patent: Dec. 24, 2024

(54) LIGNIN-CONTAINING POLYURETHANES

(71) Applicant: RAMPF HOLDING GMBH & CO. KG, Grafenberg (DE)

(72) Inventors: Frank Dürsen, Münsingen (DE); Gunnar Geiger, Dußlingen (DE); Andrea Sander, Grafenberg (DE); Michael Kugler, Aalen (DE)

(73) Assignee: RAMPF HOLDING GMBH & CO. KG, Grafenberg (DE)

( * ) Notice: Subject to any disclaimer, the term of this patent is extended or adjusted under 35 U.S.C. 154(b) by 1051 days.

(21) Appl. No.: 17/045,216

(22) PCT Filed: Apr. 5, 2019

(86) PCT No.: PCT/EP2019/058612
§ 371 (c)(1),
(2) Date: Oct. 5, 2020

(87) PCT Pub. No.: WO2019/193142
PCT Pub. Date: Oct. 10, 2019

(65) Prior Publication Data
US 2021/0163746 A1 Jun. 3, 2021

(30) Foreign Application Priority Data

Apr. 6, 2018 (EP) .................................. 18166076

(51) Int. Cl.
| | | |
|---|---|---|
| *C08L 97/00* | (2006.01) | |
| *C08G 18/32* | (2006.01) | |
| *C08G 18/36* | (2006.01) | |
| *C08G 18/40* | (2006.01) | |
| *C08G 18/48* | (2006.01) | |
| *C08G 18/64* | (2006.01) | |
| *C08G 18/76* | (2006.01) | |
| *C09J 175/06* | (2006.01) | |
| *C09J 175/08* | (2006.01) | |

(52) U.S. Cl.
CPC ........ *C08L 97/005* (2013.01); *C08G 18/3228* (2013.01); *C08G 18/36* (2013.01); *C08G 18/4081* (2013.01); *C08G 18/48* (2013.01); *C08G 18/6492* (2013.01); *C08G 18/7664* (2013.01); *C09J 175/06* (2013.01); *C09J 175/08* (2013.01)

(58) Field of Classification Search
CPC ..... C08L 97/005; C09J 175/06; C09J 175/08; C08G 18/6492; C08G 18/7664; C08G 18/48; C08G 18/3228; C08G 18/36; C08G 18/4081
See application file for complete search history.

(56) References Cited

U.S. PATENT DOCUMENTS

2011/0098384 A1* 4/2011 Blount ............... C08G 18/6492
524/72

FOREIGN PATENT DOCUMENTS

| EP | 2677030 A1 * | 12/2013 | ............. C08G 18/36 |
|---|---|---|---|
| JP | 6-25457 A * | 2/1994 | |
| JP | 2013170245 A | 9/2013 | |
| WO | 2014044234 A1 | 3/2014 | |

OTHER PUBLICATIONS

International search report for PCT/EP2019/058612. Mailed Jun. 4, 2019. 13 pages.
European Search Report in 18166076.2. Mailed Sep. 4, 2018. 18 pages.

* cited by examiner

*Primary Examiner* — Rabon A Sergent
(74) *Attorney, Agent, or Firm* — Meunier Carlin & Curfman LLC

(57) ABSTRACT

The present invention relates to generally relates to polyurethanes containing at least one lignin compound. In particular, the invention relates to a reactive polyurethane system comprising at least one polyol, at least one polyisocyanate and at least one lignin compound. In further aspects, the invention relates to a process for producing a polyurethane from a reactive system as disclosed, a polyurethane obtainable by such process, polyurethane adhesives, articles comprising cured polyurethane adhesives and a method for adhesive bonding.

11 Claims, 5 Drawing Sheets

LIGNIN-CONTAINING POLYURETHANES

CROSS-REFERENCE TO RELATED APPLICATIONS

Figure 1:

This application is a United States National Phase Patent Application of International Patent Application Number PCT/EP2019/058612, filed on Apr. 5, 2019, which claims the benefit of priority to EP application Ser. No. 18/166,076.2, filed Apr. 6, 2018, which is incorporated by reference herein in its entirety.

FIELD OF THE INVENTION

The present invention generally relates to polyurethanes containing at least one lignin compound. In particular, the invention relates to a reactive polyurethane system comprising at least one polyol, at least one polyisocyanate and at least one lignin compound. In further aspects, the invention relates to a process for producing a polyurethane from a reactive system as disclosed, a polyurethane obtainable by such process, polyurethane adhesives, articles comprising cured polyurethane adhesives and a method for adhesive bonding.

BACKGROUND OF THE INVENTION

Multicomponent reactive polyurethane systems are known for a long time and are typically used for preparing, e.g., adhesives, casting materials, foams, and coatings in various industries.

With specific reference to adhesives, adhesion to substrate surfaces (metal, wood, concrete, plastics) often is not satisfactory, such that means have to be taken in order to improve adhesion. In the prior art, one means is to treat the respective surface for optimal adhesion. However, it is frequently required to perform a number of treatments selected from surface preparation (such as cleaning, degreasing) surface pre-treatment (such as grinding, sanding, pickling) and surface post-treatment (such as use of solvents containing primers or adhesive cleaners). Additional process steps mean higher costs of preparation of articles and therefore are considered disadvantageous. Moreover, many of the treatment methods are problematic under safety or toxicological aspects, and problems may be encountered despite having carried out surface treatment.

Therefore, it would be desirable to have a universally applicable, easy and robust method of improving adhesion independent of the person performing the adhesive bonding and independent of external conditions.

Lignin is one of the main constituents of wood. It represents up to 30 percent of the lignocellulose biomass, and is, besides cellulose, one of the most abundant polymers occurring in nature. The resinous substance consists of different aromatic building blocks, so-called phenylpropanoids. Lignin monomers include the phenolic compounds syringol, guaiacol and catechol. The aromatic basic building blocks form a high molecular weight, three-dimensional network, acting as a support of woody parts of plants.

Every year, approximately 50 million tons of lignin are produced worldwide, mainly as a by-product of the paper industry. Lignin is usually extracted from wood pulp using a sulfate process during which debarked wood chips, straw or crushed corn stalks are heated for several hours in large pressure vessels with sodium hydroxide in order to separate lignin from fibrous cellulose. Lignin accumulates in the form of black liquor (kraft-lignin). The material potential of lignin remains largely unused: Over 90 percent of lignin is used in generation of thermal energy (combustion, charcoal production).

An alternative extraction process for lignocellulose-containing material, by which sulfur-free lignin can be obtained, is described in DE 10 2015 006 926 A1. This document relates to a process for recovery of, inter alia, lignin from biomass by using ionic liquids (IL), e.g. reactive ammonium-salt based ionic liquids or reactive iminium-salt based ionic liquids (RIBILs). This procedure even allows obtaining fractions of lignin with a relatively low molecular mass.

By partial or complete degradation, lignin oligomers (lignin tar and lignin oil) and the lignin monomers guaiacol, catechol and syringol can be obtained. Degradation may be effected in a process called base-catalyzed depolymerization (BCD). BCD leads to hydrolysis of ether bonds in macromolecular lignin and, thus, to formation of monomeric, dimeric and oligomeric alkyl-functionalized aromatic compounds.

In the polymer industry, lignin, which includes a plurality of hydroxyl groups, has been used as reactive component e.g. in polyurethane (PU) formulations. To this end, lignin is, e.g., reacted with isocyanates and is then used as a liquid constituent of reactive PU systems. The reason for this approach is to avoid high viscosities expected when solid lignin particles are suspended into the polyol matrix thereby being confronted with the risk of inhomogeneity. For example, DE 195 45 527 A1 describes lignin containing isocyanate prepolymer mixtures and their use in PU synthesis. These prepolymer mixtures are prepared by reacting at least one organic polyisocyanate based on diphenylmethane diisocyanate with at least one polyhydroxyl component consisting at least in part of a solution of lignin in polyoxyethylene glycol.

According to another approach, lignin is used as a constituent in the polyhydroxyl compound. For example, DE 196 48 724 A1 describes lignin containing polyhydroxyl compounds and their use in PU synthesis. In this document, lignin containing solutions which are obtained from lignins with a high salt content and polyalkylene glycols are reacted with alkylene oxides to prepare the desired lignin containing polyhydroxyl compounds.

DE 103 33 958 A1 relates to PU formulations with improved adhesion properties, where at least one tannin compound is used as an adhesion promoter. However, tannin is, in contrast to lignin, well soluble in water, ethanol and other solvents.

BRIEF SUMMARY OF THE INVENTION

Provided herein is a reactive polyurethane system comprising at least one lignin compound, polyurethanes obtained therefrom and articles where such a polyurethane is present, e.g. as an adhesive. Also provided is a method for producing the described polyurethanes, their uses, as well as a method for adhesive bonding of at least two substrates.

It has surprisingly been found that lignin and lignin derivatives can be used in the preparation of polyurethanes. It was particularly surprising that lignin can be used in solid form, particularly as a fine powder, as an adhesion promoter. Contrary to the prior art, this does not necessitate an additional process step, because lignin can simply be dispersed e.g. into the polyol component of a reactive polyurethane system. Addition of toxic components (such as primers) or physical (pre)treatment of the surface, which may be problematic under safety aspects, is unnecessary.

In addition, it was surprisingly found that the dispersed lignin also acts as an anti-sedimentation agent, which prevents premature sedimentation of fillers. Thereby, e.g. stable adhesive systems, which are characterized by an advantageous non-sag behavior, or reactive casting compounds can be prepared. Also, the lignin-containing PU systems are markedly improved regarding important mechanical parameters like tensile strength, tensile shear strength and E-modulus as compared to reference systems without lignin.

These observations are particularly surprising since lignin is known to increase viscosity in suspensions containing it and is hardly soluble in water and other solvents.

Accordingly, the present invention is directed to a reactive polyurethane-system comprising (i) at least one polyol (A), (ii) at least one polyisocyanate (B), and (iii) at least one lignin compound (C).

The at least one polyol (A) is particularly a hydrophobic polyol, more particularly a hydrophobic polyester-based polyol, or an oil, particularly a natural oil, more particularly a vegetable oil, or a derivative of an oil, particularly a derivative of a vegetable oil, wherein said vegetable oil or derivative thereof is particularly selected from the group consisting of castor oil, preferably castor oil from first pressing, castor oil with low water content, castor oil with low acid value, pharmaceutical grade castor oil, blown castor oil, partially dehydrated castor oil, partially hydrogenated castor oil, castor oil esters, e.g. castor oil esters with lower alkanols, such as methanol and ethanol, and ricinoleic acid esters with $C_{1-6}$ alkanols or typical diols, such as 1,2-propanediol, 1,3-propanediol, 1,2-butanediol, 1,3-butanediol, 2,3-butanediol, 1,4-butanediol, ethylene glycol, diethylene glycol, triethylene glycol, pentanediols, hexanediols or diols with even higher molecular weight.

In some embodiments, the at least one polyol (A) comprises at least 12 consecutive carbon atoms per molecule, wherein the ratio of carbon atoms to oxygen atoms per molecule is at least about 4, e.g. about 6, preferably 4-8.

The at least one polyisocyanate (B) is particularly selected from the group consisting of an aromatic polyisocyanate and an aliphatic polyisocyanate, preferably an aromatic polyisocyanate. Preferred aromatic polyisocyanates are monomeric methylenedi(phenylisocyanate) (MDI), polymeric MDI, and toluylene diisocyanate (TDI), more preferably polymeric MDI. Preferred aliphatic polyisocyanates are methylenedi(cyclohexyl isocyanate) (HMDI), isophorone diisocyanate (IPDI), pentamethylene diisocyanate (PDI) and hexamethylene diisocyanate (HDI).

The at least one lignin compound (C) is a lignin or a lignin derivative. In preferred embodiments, the lignin compound is a lignin, which is selected from the group consisting of kraft-lignin, organosolv-lignin, hydrolysis lignin, IL-lignin and any combination thereof. The lignin particularly is present in powder form, e.g. having a mean particle size (D50) of ≤300 µm, e.g. 300 µm, 200 µm, 100 µm, preferably ≤50 µm, more preferably ≤10 µm. The mean particle size in the context of the present invention is given as the volume median (D50), i.e. the value where half of the particle population resides above this value and half below this value. There are various methods for determining particle size distribution known to the skilled person, and one example is laser diffraction. The lignin particularly has a maximum humidity of 10%, preferably 5% or less by weight with regard to the total weight of the at least one lignin compound (C). A lignin derivative according to the invention is particularly selected from modified lignin, e.g. an organically modified lignin, and a lignin degradation product, e.g. lignin monomers and base-catalyzed degradation (BCD) lignin oligomers, each of which is optionally organically modified, e.g. by epoxidation/ring opening.

In some embodiments, the reactive polyurethane-system further comprises (iv) at least one additive (D). The at least one additive (D), if present, is particularly selected from polyether polyol, filler, foaming agent, abrasion reducer, amine catalyst, molecular sieve, antioxidant, flame retardant, antistatic agent, cell opener, dye, crosslinker, surfactant, softening agent, polyamine, or any combination thereof.

In some embodiments, the solubility of component (iii) in component (i) is characterized by the Hansen Solubility Parameters (HSP) distance ($R_{AB}$) in Hansen space between component (i) and component (iii) being greater than the interaction radius ($R_0$) of component (iii); particularly, this relation is characterized by the formula $R_0<R_{AB}<1.4 \cdot R_0$, preferably $R_0<R_{AB}<1.25 \cdot R_0$.

The invention is further directed to a process for producing a polyurethane (PU) from a reactive polyurethane-system as described herein, comprising the steps of
(1) dispersing component (iii) and optionally component (iv) in component (i),
(2) mixing component (ii) with the dispersion obtained in step (1),
(3) optionally loading the mixture obtained in step (2) with gas, such as air, (4) pouring the mixture obtained in step (2) or (3) onto a surface, optionally at elevated temperature,
(5) optionally postcuring the mixture obtained in step (4), and
(6) optionally shaping the product obtained after step (4) or (5) into the desired dimensions.

The invention is further directed to a polyurethane (PU) obtainable by the above-described process. Such a polyurethane may be a foam, a casting material, a coating, or an adhesive.

The invention further relates to the use of reactive polyurethane systems as an adhesive, as well as to polyurethane adhesives as such. In particular, the invention provides a two-component polyurethane adhesive, comprising a first component comprising components (i), (iii) and optionally (iv) as defined herein and a second component comprising component (ii) as defined herein. The ratio of isocyanate reactive hydrogen atoms to isocyanate groups may be from 100% to 115%.

The invention is further directed to articles comprising substrates bonded together by a two-component polyurethane adhesive as defined herein.

Still further, the invention relates to the use of a lignin compound (C) as defined herein as an adhesion promoter and/or an anti-sedimentation agent.

Finally, the invention is directed to a method for adhesive bonding at least two substrates, comprising applying a reactive polyurethane system or adhesive as defined herein to either one of the substrates or to both substrates and contacting the applied PU system or adhesive with the second substrate or with one another during the open time of the PU system or adhesive.

DETAILED DESCRIPTION OF THE INVENTION

The present invention is, in a first aspect, concerned with providing a reactive polyurethane-system comprising (i) at least one polyol (A), (ii) at least one polyisocyanate (B), and (iii) at least one lignin compound (C).

The long-term performance and durability of some polyurethanes can be adversely affected by exposure to high ambient humidity or by direct or prolonged contact with water. Water can potentially take part in hydrolysis reactions degrading the PU backbone, and it even can plasticize the polymer network, resulting in an apparent reduction in critical performance properties such as tensile strength or E-modulus.

According to the present invention "polyol" means any compound which has at least 2, preferably 2, 3 or 4 hydroxyl groups. In a preferred embodiment the hydroxyl groups are capable of reacting with isocyanate groups.

In one embodiment the at least one polyol (A) may be a hydrophobic polyol. Hydrophobicity according to the invention can be determined by various methods.

An established parameter for determining hydrophobicity is the so-called "octanol-water partition coefficient" $K_{OW}$ (which is also known as its decadic logarithm log $K_{OW}$, log P, log $P_{ow}$ or log $P_{oct}$). $K_{OW}$ describes the ratio of the concentration of a compound in n-octanol and the concentration in water when the two phases are in equilibrium: $K_{OW}=c_O/c_W$. The octanol-water partition coefficient thus is a measure of the lipophilicity of a compound. One established method for determining this parameter is described in OECD Test Guideline 123 (2006): Partition coefficient (1-octanol/water): slow-stirring method; OECD Publishing, Paris, France. The content of this document is incorporated by reference herein. Briefly, the method comprises the following steps: fill a stirring vessel with 1-octanol-saturated water, allow for reaching the predetermined thermostated temperature, add the desired amount of test substance (dissolved in the required volume of 1-octanol saturated with water) and stir (maximum stirring rate to create a vortex at the interface between water and 1-octanol of 0.5 to maximally 2.5 cm depth). After stirring, samples from both phases are taken and analyzed. The procedure is repeated twice with gradually increased stirring rates. The advantages of $K_{OW}$ are that experimental data are available for many chemicals and estimates may be obtained from software that is based on the molecular structure of the compound, including EPISUITE and SPARC. Log $K_{OW}$ is generally inversely related to water solubility and directly proportional to molecular weight of a substance.

Another established method for determining $K_{OW}$ is described in OECD Test Guideline 117 (2004): Partition Coefficient (n-octanol/water), HPLC Method, OECD Publishing, Paris, France, the content of which is also incorporated by reference herein. This reverse phase high performance liquid chromatography (RP-HPLC) based method is faster and less expensive than the slow-stirring method (only retention time needs to be measured), and is sometimes more accurate, particularly for highly hydrophobic compounds. One reference substance used according to OECD Test Guideline 117 is dodecanoic acid with a log $P_{ow}$ of 4.2. For ricinoleic acid, a log $K_{OW}$ of −1.76 has been determined (see e.g. MSDS Ricinoleic acid; Acme Hardesty, Version 2.0, issued 19 Mar. 2015). For dehydrated castor oil (CAS number: 64147-40-6), an experimental determination using OECD Test Guideline 117 is not applicable due to the limits of the analytical detection method. Therefore, the log $K_{OW}$ was estimated by QSARs (OECD quantitative structure-activity relationships) based on its individual constituents with the following result: log $K_{OW}$>16 (see European Chemicals Agency (ECHA) Registration Dossier). Large databases of partition coefficients, e.g. LOGKOW (Sangster Research Laboratories; see J. Sangster, GDF Databanks Bulletin, Vol. 1, No. 1, 1997), are available.

Accordingly, in some embodiments of the reactive polyurethane system of the invention, the hydrophobicity of, e.g., component (i) is determined via $K_{OW}$. Particularly, a hydrophobic polyol according to the invention may have a log $K_{OW}$ of ≥4.0, more particularly ≥5.0, e.g. between 5.0 and 20.0. Measurements are carried out at 25° C., unless indicated otherwise.

A hydrophobic polyol component (A) according to the invention preferably comprises at least 12 consecutive carbon atoms per molecule, wherein the overall ratio of carbon atoms to oxygen atoms (C:O ratio) per molecule is at least about 4, e.g. about 6, preferably 4-8. As long as the requirement of 12 consecutive carbon atoms is fulfilled, it is also possible that the molecule contains further carbon atom containing substituents, e.g. alkyl, alkenyl or alkinyl groups, or that the linear chain contains a heteroatom after the first twelve C-atoms, e.g. a nitrogen atom, an oxygen atom (as long as the C:O ratio remains at a value of about 4 or higher, e.g. about 6, or a sulfur atom is present. Longer repeats of the hydrophilic group $(CH_2-CH_2-O)_n$ (with n≥2) will only be possible with very long carbon atom chains.

According to some embodiments of the invention, the at least one polyol is a polyester-based polyol, in particular a hydrophobic polyester-based polyol, such as an aliphatic polyester polyol or an aromatic polyester polyol. Typical aliphatic hydrophobic polyester polyols derive from $C_6$-$C_{22}$-alkyl dicarboxylic acids, such as 1,12-dodecanedioic acid and 1,9-nonanedioic acid and/or $C_6$-$C_{22}$-alkyldiols such as 1,9-nonanediol. Of course, difunctional fatty acids, difunctional fatty alcohols or dimerized fatty acids or fatty alcohols could be used here as well. Aromatic hydrophobic polyester polyols can derive from terephthalic or isophthalic acid and aliphatic $C_6$-$C_{22}$ diols.

According to other embodiments of the invention, the at least one polyol (A) is an oil, particularly a natural oil, or a derivative of an oil. A natural oil in the context of the present invention is an oil obtained directly from living organisms including microbes, animals and plants, and optionally being further refined afterwards. It does not include petroleum oil. For example, a natural oil may be an animal oil, such as oil from fish, e.g. cod, mackerel, salmon, sardine, or from sea mammals, e.g. whales. A natural oil may also be a vegetable oil, i.e. an oil obtained from oil-containing parts of plants, e.g. kernels or seeds. The term "vegetable oil" according to the invention includes, but is not limited to, castor oil, soybean oil, safflower oil, peanut oil, rapeseed oil, sunflower oil, palm oil, linseed oil, olive oil, tung oil, corn oil, canola oil, sesame oil and cottonseed oil.

In certain embodiments, the at least one polyol (A) is a vegetable oil selected from the group consisting of castor oil, soybean oil, safflower oil, peanut oil, rapeseed oil, sunflower oil, palm oil, linseed oil, olive oil, tung oil, corn oil, canola oil, sesame oil and cottonseed oil, or a blend of at least two of these oils. Also encompassed by the invention are mixtures of oils, e.g. mixtures of one or more vegetable oils with one or more animal oils, e.g. fish oil. It is clear that the oil, when used as a polyol component (A), has at least 2, preferably 2, 3 or 4 hydroxyl groups.

A "derivative of an oil" in the context of the invention is particularly a reaction product of an oil, e.g. a vegetable oil, that has been chemically modified e.g. by epoxidation, hydrolysis, esterification, transesterification, amidation and ozonolysis.

In certain embodiments of the invention, a derivative of an oil, particularly a vegetable oil, is a reaction product obtainable by subjecting said (vegetable) oil to a transesterification reaction with an alcohol. The reaction product may be a mixture of fatty acid esters, e.g. monoacylglycerides, diacylglycerides, and fatty acid alkyl esters. Of course, it is also possible to fractionate the reaction product, e.g. by fractionated molecular distillation. Suitable alcohols for transesterification of (vegetable) oils according to the invention are ethylene glycol, diethylene glycol, triethylene glycol, tetraethylene glycol, polyethylene glycol, propylene glycol, dipropylene glycol, tripropylene glycol, tetrapropylene glycol, polypropylene glycol, glycerol, pentaerythriol, di-pentaerythriol, tri-pentaerythriol, trimethyolpropane (TMP), sorbitol, isosorbide, cyclohexanediol, fatty dialcohols, propanediols, butanediols, pentanediols, hexanediols, cyclohexanediols, di- and polyamines like ethylene diamine, neopentylamine, diaminohexane, diethylene triamine, triethylene tetramine, aminoalcohols like ethanolamine, diethanolamine, and triethanolamine, but also simple aliphatic alcohols like methanol, ethanol, propanol, isopropanol and butanols.

In other embodiments of the invention, a derivative of an oil, particularly a vegetable oil, is a reaction product obtainable by subjecting said (vegetable) oil to an epoxidation and subsequent ring opening.

In yet other embodiments of the invention, a derivative of an oil, particularly a vegetable oil, is a reaction product obtainable by subjecting said (vegetable) oil to an amidation.

In yet other embodiments of the invention, a derivative of an oil, particularly a vegetable oil, is a reaction product obtainable by subjecting said (vegetable) oil to a hydroformylation and subsequent reduction.

In yet other embodiments of the invention, a derivative of an oil, particularly a vegetable oil, is a reaction product obtainable by subjecting said (vegetable) oil to an ozonolysis and subsequent reduction.

In yet other embodiments of the invention, a derivative of an oil, particularly a vegetable oil, is a reaction product obtainable by subjecting said (vegetable) oil to a thiol-ene addition.

In yet other embodiments of the invention, a derivative of an oil, particularly a vegetable oil, is a reaction product obtainable by subjecting said (vegetable) oil to an epoxide hydrogenation.

In yet other embodiments of the invention, a derivative of an oil, particularly a vegetable oil, is a reaction product obtainable by subjecting said (vegetable) oil to an ester reduction.

In yet other embodiments of the invention, a derivative of an oil, particularly a vegetable oil, is a reaction product obtainable by subjecting said (vegetable) oil to a Diels-Alder cyclization.

In yet other embodiments of the invention, a derivative of an oil, particularly a vegetable oil, is a reaction product obtainable by subjecting said (vegetable) oil to a double-bond oxidation to peroxides and reduction to alcohols.

In yet other embodiments of the invention, a derivative of an oil, particularly a vegetable oil, is a reaction product obtainable by subjecting said (vegetable) oil to electrophilic additions of formaldehyde, metathesis and reduction.

In yet other embodiments of the invention, a derivative of an oil, particularly a vegetable oil, is a reaction product obtainable by subjecting said (vegetable) oil to a combination of two or more of the above-described reactions.

In certain preferred embodiments the at least one polyol (A) is selected from the group consisting of castor oil, preferably castor oil from first pressing, castor oil with low water content, castor oil with low acid value, pharmaceutical grade castor oil, blown castor oil, partially dehydrated castor oil, partially hydrogenated castor oil, castor oil esters, e.g. castor oil esters with lower alkanols, such as methanol and ethanol, and ricinoleic acid esters with $C_{1-6}$ alkanols or typical diols, such as 1,2-propanediol, 1,3-propanediol, 1,2-butanediol, 1,3-butanediol, 2,3-butanediol, 1,4-butanediol, ethylene glycol, diethylene glycol, triethylene glycol, pentanediols, hexanediols or diols with even higher molecular weight.

Specific suitable examples of polyols for use in the invention are castor oil form first pressing, soy bean polyol (hydroxyl value 148), hydrogenated castor oil, and castor oil methyl ester.

Apart from the at least one polyol (A), the reactive polyurethane system of the invention contains at least one polyisocyanate (B). Various polyisocyanates for use in PU systems are known to the skilled person. In the context of the present invention, in particular at least one compound selected from the group consisting of an aromatic or aliphatic polyisocyanate may be used as the at least one polyisocyanate (B). Particular examples of aromatic polyisocyanates for use in the invention are monomeric methylenedi(phenylisocyanate) (MDI), polymeric MDI and toluylene diisocyanate (TDI), preferably polymeric MDI. Particular examples of aliphatic polyisocyanates for use in the invention are methylenedi(cyclohexyl isocyanate) (HMDI) and isophorone diisocyanate (IPDI), pentamethylene diisocyanate (PDI) and hexamethylene diisocyanate (HDI). In certain preferred embodiments, polymeric MDI is used as polyisocyanate (B).

In the reactive polyurethane-system according to the invention, the NCO content of the at least one polyisocyanate (B) (component (ii)) is usually from about 25% to about 40%. Particularly, the NCO content is 30-35%, preferably 30-33%, more preferably 30.5-31.5%.

In certain preferred embodiments, the at least one polyisocyanate (B) (component (ii)) is polymeric MDI, preferably polymeric MDI with an NCO content of about 31% or exactly 31%. An exemplary component (ii) for use according to the invention is commercially available as Desmodur® 44V20LF (Covestro, Leverkusen, Germany).

As a further mandatory component, the reactive polyurethane system of the invention contains at least one lignin compound (C) (component (iii)). The at least one lignin compound (C) may be a lignin, i.e. lignin in polymeric form, which has been extracted from a natural lignin source such as wood.

Lignin can be extracted by physical and/or chemical and biochemical methods, as is known to the skilled person. Non-limiting examples of known extraction methods for lignin are aqueous dioxane extraction of finely milled wood, ethanol extraction of ground wood (e.g. fine sawdust), or dissolution of lignin at high temperature and pressure with chemicals. One economically significant method yielding high amounts of lignin is the so-called kraft or sulfate process for conversion of wood into wood pulp, which consists of almost pure cellulose fibers, the main component of paper. In the kraft process, wood chips or other small pieces of material containing lignin are heated under elevated pressure, (e.g. 7 to 10 bar) in the presence of alkali (sodium hydroxide), sodium sulfide and sodium sulfate. Further well-known methods are the organosolv process, which is based on the treatment of biomass with an (aqueous) organic solvent, e.g. ethanol, methanol, acetone and organic acids or combinations thereof, at elevated temperatures, and the hydrolysis process, wherein wood is either treated with inorganic acids (e.g. hydrochloric acid, sulfuric acid) or organic acids (e.g. formic acid, acetic acid). Lignin may also be extracted via enzymatic hydrolysis. The lignins obtained from the above processes are termed kraft-lignin, organosolv-lignin and hydrolysis lignin, respectively.

Yet a further process to obtain lignin is described in DE 10 2015 006 926 A1 (which is fully incorporated by reference herein), wherein specific ionic liquids (ILs) are used for obtaining, inter alia, lignin. Lignin is soluble in these ILs (which are used together with suitable organic co-solvents such as glycol, 1,2-propanediol etc.) and can be precipitated by adding suitable precipitation agents, e.g. water or methanol. Obtaining lignin with this process has the additional advantage that the lignin is sulfur-free (and thus odorless) and can be fractionated depending on its molecular mass (by fractionated precipitation). Lignin obtained with this process is referred to as "IL-lignin" within the context of this invention. Notably, if the lignin is not precipitated, the IL/organic co-solvent with lignin and hemicellulose dissolved therein can be used as a polyol component for the preparation of polyurethanes after removing the insoluble cellulose by filtration (e.g. overnight). This polyol component is sulfur-free and virtually odorless, despite being obtained directly from e.g. wood chips.

Preferably, the lignin according to the invention is selected from the group consisting of kraft-lignin, organosolv-lignin, hydrolysis lignin, IL-lignin and any combination thereof.

Further, it is preferred that the lignin is highly pure lignin, i.e. it contains impurities, such as ashes or sulfur, in an amount of 4% by weight or less. In one embodiment the lignin component contains 4% by weight, more preferably 0.1-3% by weight of ashes. The low content of ashes in the lignin compound provides excellent dispersibility.

The at least one lignin compound (C) (component (iii)) may also be a lignin derivative. A "lignin derivative" as used herein is a compound or mixture of compounds that is structurally related to lignin. Lignin derivatives are preferably obtained by chemical conversion of lignin. Within the context of the present invention, particularly two groups of lignin derivatives are of interest, i.e. modified lignins and lignin degradation products.

Modified lignins are preferably organically modified lignins. An organically modified lignin in the context of the present invention is a lignin, the free functional groups of which, e.g. methoxy, phenolic hydroxyl, aliphatic hydroxyl, carbonyl, particularly hydroxyl groups and/or carbonyl groups, are at least partly reacted with other compounds, e.g. carboxylic acids, isocyanates, isocyanate prepolymers, amines or alcohols (also including carbohydrates) to form ester, urethane, amide, or ether groups. The core structure of the starting lignin is maintained.

In some embodiments, the organically modified lignin is modified by reaction of at least a part of its hydroxyl groups with activated carboxylic acids, isocyanate or isocyanate prepolymers under formation of ester or urethane groups.

In other embodiments, the organically modified lignin is modified by reaction of at least a part of its carbonyl groups with activated amines or alcohols under formation of ester and amide groups. Preferred examples of organically modified lignins according to the invention are reaction products deriving from conversion of lignin with isocyanate prepolymers or carbohydrates (including monosaccharides and oligosaccharides).

A lignin degradation product in the context of the present invention derives from a chemical degradation of lignin. Such degradation processes are known in the art and include e.g. base-catalyzed degradation of lignin. A lignin degradation product may comprise at least one and up to 20 lignin monomers. In some embodiments, the lignin degradation product is a lignin monomer, e.g. selected from guaiacol, syringol, catechol, or a mixture of lignin monomers. In other embodiments, the lignin degradation product comprises lignin oligomers (e.g. at least two and up to 10 monomers). Lignin oligomers are e.g. referred to as BCD lignin oligomers, if made under base catalyzed conditions. Also comprised by the definition "lignin degradation product" are lignin tar and lignin oil.

The lignin degradation products can either be used as such, or can be further organically modified (see above) e.g. in order to increase the number of reactive primary or secondary hydroxyl groups.

For example, lignin degradation products, e.g. lignin oligomers or lignin monomers, can be subjected to epoxidation and subsequent ring-opening to provide more reactive (e.g. primary or secondary) hydroxyl groups. These reactive hydroxyl group-containing lignin degradation products can be used as a polyol component in polyurethane synthesis either as such (i.e. without subjecting them to further reactions), or after being esterified to ester polyols using dicarboxylic acids.

Also, lignin monomers such as catechol can be esterified or etherified, e.g. with glycidol or glycerol, or they can be reacted with isocyanates (e.g. MDI) to form prepolymers.

Exemplary organically modified lignin degradation products according to the invention are 3-aryloxy-1,2-propanediols, wherein aryl is preferably phenyl which is optionally one, two or three times independently substituted with $C_1$-$C_3$ alkyl, $C_1$-$C_3$ alkoxy, $C_2$-$C_3$ alkenyl or hydroxyl groups. As a specific example, guaiacol (an alcohol with one hydroxyl group of low reactivity) can be converted to a di-alcohol, e.g. by reacting it with glycidol to provide a guaiacol-glycerolether (3-(o-Methoxyphenoxy)-1,2-propanediol), which contains two reactive aliphatic hydroxyl groups (instead of one less reactive aromatic hydroxyl group) and thus represents an ideal monomer for ester polyol synthesis. Exemplary glycidolization reactions of guaiacol are the reaction of guaiacol with glycidol in the presence of amine catalyst in ethanol at 84° C., or the reaction of guaiacol with glycidol in the presence of sodium hydroxide at 90° C. (see e.g. EP 0 058 987 A1). Analogous glycidolization reactions may also be carried out with other lignin monomers or even lignin oligomers.

Another organic modification of lignin degradation products such as guaiacol, syringol, catechol, lignin tar or lignin oil is the reaction with epichlorohydrin (and subsequent ring opening).

Ester polyols obtainable from lignin monomers or lignin oligomers have a broad specification range, e.g. in terms of hydroxyl value, molar mass and functionality, combined with a high content of aromatic moieties and reduced odor (see Example 6). The high content in aromatic moieties can provide improved flame-retardant properties in end products. In an exemplary embodiment, an ester polyol based on a lignin degradation product is obtained by reacting a guaiacol-glycerolether with adipic acid and optionally a crosslinking agent (e.g. trimethylolpropane). This ester polyol can be used to prepare a rigid PU foam, which has advantageous properties in terms of compressive strength and flame retardancy.

In particular embodiments of the invention, the at least one lignin compound (C) has not been subjected to chemical pretreatment as known in the art. Such chemical pretreatment includes formation of a soluble prepolymer e.g. by conversion with isocyanate.

It is preferred according to the invention that, when the at least one lignin compound (C) comprises or consists of lignin, the lignin is present in powder form. Powders of lignin obtained according to various processes discussed above are commercially available, e.g. from Sigma Aldrich.

It is also preferred that the lignin powder has a maximum humidity of 10%, preferably 5%, more preferably 0.001-3.5%, by weight with regard to the total weight of the lignin compound (C) (component (iii)).

It is further preferred that the lignin powder has a mean particle size (D50)≤300 μm, preferably ≤50 μm, more preferably ≤10 μm. According to particularly preferred embodiments, the mean particle size (D50) of the lignin powder is between 0.01 and 10 μm.

In addition to the already mentioned components (i) at least one polyol (A), (ii) at least one polyisocyanate (B), and (iii) at least one lignin compound (C), the reactive polyurethane-system according to the invention may further comprise (iv) at least one additive (D). Common additives are known to the skilled person and are, for instance, discussed in the textbook Oertel, G. (ed.): "Polyurethane" $3^{rd}$ ed., Carl Hanser Verlag München Wien, 1993 (see chapter 3.4 "Hilfs- and Zusatzstoffe für Polyurethane"). In some embodiments, the at least one additive (D) is selected from the group consisting of polyether polyol, filler, foaming agent, abrasion reducer, amine catalyst, molecular sieve, antioxidant, flame retardant, antistatic agent, cell opener, dye, crosslinker, surfactant, softening agent, polyamine, or any combination thereof.

As exemplary polyether polyols, an EO/PO based polyether with different starters like diols, triols diamines, triamines, sucrose, sorbitol, Mannich bases may be used in the invention. In certain preferred embodiments, an Arcol® polyether polyol (commercially available from Covestro, Leverkusen, Germany) is used, e.g. Arcol® 1030 (hydroxyl value 380-420 mg KOH/g, water content 0.050% by wt., viscosity at 25° C. 330-410 mPa·s, acidity ≤0.100 mg KOH/g, density approx. 1.05 g/cm$^3$).

Exemplary fillers for use according to the invention are calcium carbonate, kaolin, aluminum oxide and aluminum hydroxide. In certain preferred embodiments, calcium carbonate is used, e.g. Calcit MX 30 (commercially available from SH minerals, Heidenheim, Germany).

As exemplary foaming agents, water, carbon dioxide, pentane, 1,1,1,2-tetrafluoroethane (HFC-134a), 1,1,1,3,3-Pentafluoropropane (HFC-245fa) etc. may be used in the invention.

Suitable amine catalysts according to the invention are e.g. 1,4-diazabicyclo[2.2.2]octane (DABCO; also referred to as triethylenediamine) and bis-(2-dimethylaminoethyl) ether. In certain preferred embodiments, triethylenediamine is used. Surprisingly it was found that such amine catalysts are more active than metal catalysts established in the field, such as tin or bismuth catalysts.

Exemplary crosslinkers for use according to the invention are glycols like EG, DEG, diols like 1,4-butanediol, triols like glycerin, TMP etc.

As exemplary polyamines, polyetheramines, e.g. Jeffamines® (commercially available from Huntsman Corp., The Woodlands, TX, USA) may be used in the invention.

Suitable surfactants for use in the invention are e.g. silicone surfactants (such as Tegostab® (commercially available from Evonik, Essen, Germany), high-molecular-weight (Efka® 4000 Series) or low-molecular-weight (Efka® 5000 and Efka® 6000 Series, all available from BASF, Ludwigshafen, Germany) dispersion additives and dispersion and deaeration additives commercially available from Byk-Chemie, Wesel, Germany.

As suitable molecular sieves, various zeolites can be used according to the invention. In certain preferred embodiments, molecular sieve A3 (pore size 3 Å) is used. It has been surprisingly found that addition of molecular sieve into the reactive polyurethane system prevents infiltration of humidity between the substrate-adhesive interface.

According to certain embodiments of the invention, the component (i) (polyol component (A)) is selected such that it does not completely dissolve the lignin compound (C), which is particularly a lignin in powder form as described herein, but does interact with the lignin compound (C). This setting is particularly advantageous regarding an anti-sedimentation effect of the lignin compound, i.e. the lignin compound (C) prevents premature sedimentation of a filler, e.g. calcium carbonate, particularly in formulations with high contents of fillers (e.g. 40% by weight of the total weight of component (i) and component (iii) or higher). If the lignin compound is dissolved completely in the polyol, the viscosity of the solution increases strongly due to the high molecular weight of lignin compound. If the polyol does not interact at all with the lignin compound, the lignin particles are not stabilized, thereby favoring sedimentation of the lignin compound. Thus, the solubility of the at least one lignin compound (C) in the at least one polyol (A) should be determined to adjust best possible product properties.

In general, the lignin compound is poorly soluble in water and other solvents. Methods to determine the dissolution properties of polymers and the mixing behavior of solvent systems, respectively, are known to the skilled person.

One established method for predicting the dissolution properties of polymers and the mixing behavior of solvent systems comprises determining the so-called Hansen Solubility Parameters (HSP). Hansen solubility parameters were developed by Charles M. Hansen in 1967 to guide solvent selection in the paint and coatings industry (Hansen (1967). "The Three Dimensional Solubility Parameter and Solvent Diffusion Coefficient and Their Importance in Surface Coating Formulation" Copenhagen: Danish Technical Press, the content of which is incorporated by reference herein). Today, they are widely used in many other fields. The basis of the HSP is that the total cohesive energy can be separated in three parts. These parts arise from (atomic) dispersion forces, (molecular) permanent dipole forces, and hydrogen bonding (see e.g. http://www.polymerdatabase.com/polymer%20physics/Hansen%20Solubility%20Sphere.html)

The three Hansen parameters can be considered the coordinates of a point in the so-called Hansen space. The closer two points are, the more likely the compounds are to dissolve into each other. In the case of a polymer, only solvents within a certain range will dissolve the polymer. This range is usually an ellipsoid and only solvents within this space are likely to dissolve the polymer in question.

The partial energies and solubility parameters can only be calculated. For example, they can be predicted with equation-of-state methods (EOS) or by establishing correlations between the Hansen solubility parameters (energies) and other physical properties of the substance. For a great number of solvents, the HSP are known (see e.g. Hansen (2007). "Hansen Solubility Parameters: A user's handbook" Second Edition, Boca Raton, FL: CRC Press. ISBN 978-0-8493-7248-3, the content of which is incorporated by reference herein). Also, a software comprising a database of HSP is available (HSPiP, see e.g. https://www.hansen-solubility.com/HSPiP/). By straightforward dissolution experiments with known solvents, the solubility sphere can be determined even for complex systems such as polymers. The solubility sphere can then be visualized, e.g. by HSPiP software. The solubility parameters (HSP) of the polymer represent the center point of the sphere, the radius is termed $R_O$ (so called interaction radius or solubility radius of the component to be dissolved). The distance of the solvent coordinates ($\delta_{d2}$, $\delta_{p2}$, $\delta_{h2}$) from the center point ($\delta_{d1}$, $\delta_{p1}$, $\delta_{h1}$) of the solute sphere is given by equation (I)

$$(R_{AB})^2 = 4(\delta_{d2}-\delta_{d1})^2 + (\delta_{p2}-\delta_{p1})^2 + (\delta_{h2}-\delta_{h1})^2 \quad (I)$$

Within this equation, $\delta_d$ represents the effects of the dispersion forces (d), $\delta_p$ represents the effects of the polar forces (p), and $\delta_h$ represents the effects of the hydrogen bonding forces (h). $\delta_{x2}$ with x=d, p or h is the respective solvent coordinate and $\delta_{x1}$ with x=d, p or h is the respective center point of the solute sphere. For instance, $\delta_{d2}$ is the solvent coordinate of the dispersion forces, and $\delta_{d1}$ is the center point of the solute sphere for the dispersion forces.

As an example for determination of HSP in polymers, reference is made to Zhang and Kessler (ACS Sustainable Chem. Eng., vol. 3, pp. 743-749, 2015). In this document, the HSP for polyol 450 (P-450), a reaction product of propylene oxide and glycerol and polymeric MDI (NCO content 31%), and for soy-castor oil based polyol (SCP), prepared by ring-opening of epoxidized soybean oil by castor oil fatty acid, are determined (page 744, right-hand column, sections "Materials" and "Determination of Solubility Parameters for SCP and P-450"). HSP are given in Table 3 (page 745, see also FIG. 2 on page 746). Determination includes visual inspection of samples containing polyol and a known solvent and calculation of interaction radii using HSPiP software.

Accordingly, in some embodiments of the reactive polyurethane system of the invention, the solubility of component (iii) (lignin compound (C)) in component (i), is defined by determining the Hansen Solubility Parameters. Particularly, the solubility of component (iii) in component (i) is characterized by the Hansen Solubility Parameters (HSP) distance ($R_{AB}$) in Hansen space between component (i) and component (iii) being somewhat greater than the interaction radius ($R_O$) of component (iii). In particular, the value $R_{AB}$ is higher than the value $R_O$, but does not exceed $1.4 \cdot R_{AB}$, preferably $1.25 \cdot R_{AB}$ (i.e. $R_O < R_{AB} < 1.25 \cdot R_O$). For example, $R_{AB}$ exceeds $R_O$ by a factor of 1.01, 1.02, 1.03, 1.04, 1.05, 1.1 or 1.2.

As already mentioned above, $R_{AB}$, if not already known from tables in textbooks, can be determined according to equation (I)

$$(R_{AB})^2 = 4(\delta_{d2}-\delta_{d1})^2 + (\delta_{p2}-\delta_{p1})^2 + (\delta_{h2}-\delta_{h1})^2 \quad (I)$$

wherein $\delta_d$ represents the effects of the dispersion forces (d), $\delta_g$ represents the effects of the polar forces (p), and $\delta_h$ represents the effects of the hydrogen bonding forces (h), and wherein
$\delta_{x2}$ with x=d, p or h is the respective solvent coordinate and $\delta_{x1}$ with x=d, p or h is the respective center point of the solute sphere.

Within the context of the present invention, determination of Hansen solubility parameters is particularly carried out at 25° C., unless indicated otherwise.

When formulating the reactive polyurethane system of the invention, it is important to provide the individual components in suitable weight ratios. According to the present invention, the following amounts of components are particularly suitable:

Component (i) is particularly present in an amount of 15-35 wt %, preferably 20-30 wt %, more preferably 23-27 wt %, e.g. about 25 wt %, based on the total weight of components (i), (iii) and (iv).

Component (iii) is particularly present in an amount of 10-25 wt %, preferably 17.5-22.5 wt %, more preferably 19-21 wt %, e.g. about 20 wt %, based on the total weight of components (i), (iii) and (iv).

Component (iv) is particularly present in an amount of 40-70 wt %, preferably 50-60 wt %, e.g. about 55 wt %, based on the total weight of components (i), (iii) and (iv).

If present, the concentration of polyether polyol is preferably 5-15 wt %, more preferably 9-12 wt %, e.g. about 10 wt %, based on the total weight of components (i), (iii) and (iv).

If present, the concentration of filler is preferably 30-50 wt %, more preferably 38-42 wt %, e.g. about 40 wt %, based on the total weight of components (i), (iii) and (iv).

If present, the concentration of molecular sieve is preferably 3-8 wt %, more preferably 4-6 wt %, e.g. about 5 wt %, based on the total weight of components (i), (iii) and (iv).

If present, the concentration of amine catalyst is preferably 0.05-0.5 wt %, more preferably 0.05-0.15 wt %, e.g. about 0.1 wt %, based on the total weight of components (i), (iii) and (iv).

According to certain embodiments, the reactive polyurethane-system of the invention comprises components (i), (ii), (iii) and (iv), wherein component (iv) comprises a polyether polyol, e.g. in an amount of 5-15 wt %, preferably 9-12 wt %, a filler, e.g. in an amount of 30-50 wt %, preferably 38-42 wt %, a molecular sieve, e.g. in an amount of 3-8 wt %, preferably 4-6 wt %, and/or an amine catalyst, e.g. in an amount of 0.05-0.5 wt %, preferably 0.05-0.15 wt %, each based on the total weight of components (i), (iii) and (iv).

According to certain embodiments, the reactive polyurethane-system of the invention comprises components (i), (ii), (iii) and (iv), wherein component (iv) comprises a polyether polyol in an amount of 9-12 wt %, e.g. about 10 wt %, calcium carbonate in an amount of 38-42 wt %, e.g. about 40 wt %, a molecular sieve A3 in an amount of 4-6 wt %, e.g. about 5 wt %, and triethylenediamine in an amount of 0.05-0.15 wt %, e.g. about 0.1 wt %, each based on the total weight of components (i), (iii) and (iv).

Regarding the ratio of isocyanate reactive hydrogen atoms (in components (i), (iii) and (iv)) to isocyanate groups (in component (ii)), a variety of ratios is generally possible. However, it is preferred that in the reactive polyurethane-system according to the invention, the ratio of isocyanate reactive hydrogen atoms to isocyanate groups is from 100% to 115%. In certain preferred embodiments, the ratio is from 105% to 110%. For example, the ratio of isocyanate reactive hydrogen atoms to isocyanate groups may be about 106%, e.g. 106.0%.

Thus, according to further preferred embodiments, the reactive polyurethane-system of the invention comprises components (i), (ii), (iii) and (iv), wherein
  component (i) is selected from the group consisting of castor oil, preferably castor oil from first pressing, castor oil with low water content, castor oil with low acid value, pharmaceutical grade castor oil, blown castor oil, partially dehydrated castor oil, partially hydrogenated castor oil, castor oil esters, e.g. castor oil esters with lower alkanols, such as methanol and ethanol, and ricinoleic acid esters $C_{1-6}$ alkanols or with diols selected from 1,2-propanediol, 1,3-propanediol, 1,2-butanediol, 1,3-butanediol, 2,3-butanediol, 1,4-butanediol, ethylene glycol, diethylene glycol, triethylene glycol, pentanediols, hexanediols and diols with even higher molecular weight, more preferably castor oil from first pressing, preferably in an amount of 20-30 wt %, more preferably about 25 wt %, based on the total weight of components (i), (iii) and (iv);

component (ii) is polymeric MDI, preferably polymeric MDI which particularly has an NCO content of about 31%;

component (iii) is a lignin powder preferably having a maximum humidity of 10%, preferably 5% by weight or less with regard to the total weight of the at least one lignin compound (C), preferably having impurities in an amount of 4% by weight or less, and preferably having a mean particle size (D50) of ≤300 µm, preferably ≤50 µm, more preferably ≤10 µm, wherein the lignin is selected from the group consisting of kraft-lignin, organosolv-lignin, hydrolysis lignin, IL-lignin, preferably kraft-lignin, preferably in an amount of 17.5-22.5 wt %, more preferably about 20 wt %, based on the total weight of components (i), (iii) and (iv);

component (iv) comprises a polyether polyol, e.g. an Arcol® polyether polyol such as Arcol® 1030, preferably in an amount of 5-15 wt %, e.g. about 10 wt %, a filler, e.g. calcium carbonate, preferably in an amount of 30-50 wt %, e.g. about 40 wt %, a molecular sieve, e.g. molecular sieve A3, preferably in an amount of 3-8 wt %, e.g. about 5 wt %, and an amine catalyst, e.g. triethylenediamine, preferably in an amount of 0.05-0.5 wt %, e.g. about 0.1 wt %, each based on the total weight of components (i), (iii) and (iv); and the ratio of isocyanate reactive hydrogen atoms to isocyanate groups is from 105% to 110%, e.g. about 106%.

In a further aspect, the present invention relates to a process for producing a polyurethane (PU) from a reactive polyurethane-system as described herein. The process comprises three mandatory steps ((1), (2) and (4)) and three optional steps ((3), (5) and (6)).

As a first mandatory step (step (1)), component (iii), i.e. the at least one lignin compound (C), is dispersed in component (i), i.e. the at least one polyol (A). As described above, it is preferred that, if component (C) comprises a lignin in powder form, the at least one polyol (A) interacts with, but does not dissolve the lignin (e.g. the lignin swells). If present, component (iv) may also be dispersed in component (i) during step (1).

In the subsequent second mandatory step (step (2)), component (ii), i.e. the at least one polyisocyanate (B), is mixed with the dispersion obtained in step (1).

In optional step (3), the mixture obtained in step (2) is loaded with gas, e.g. air. This will be particularly of interest when preparing PU foams.

Subsequent to step (2), or, if carried out, step (3), the mixture obtained in step (2) or (3) is poured onto a surface, thereby allowing the mixture to react (mandatory step (4)). Step (4) can be carried out at ambient temperature (e.g. about 20° C.). However, for some applications, it may be advantageous to perform step (4) at elevated temperature, preferably at 25° C.-120° C., more preferably at 40° C.-100° C.

In optional step (5), the mixture on surface obtained in step (4) is postcured, preferably at elevated temperature, such as 25° C.-120° C., preferably 40° C.-100° C.

Optionally, after step (4) or after step (5), it is possible to shape the product obtained after step (4) or (5) into the desired dimensions.

In some embodiments of the invention, only the mandatory steps, i.e. steps (1), (2) and (4) of the above process are performed.

In preferred embodiments of the inventive process, component (iii) particularly is a lignin, more particularly a lignin in powder form. The lignin has, after step (2) of the process, a mean particle size (D50) between 1 and 200 µm. This is an indication that the lignin compound (C) may swell in the polyol, but is still particulate, such that the mixture obtained in step (1) is present as a dispersion.

A further aspect of the invention relates to polyurethane (PU), which is obtainable by a process as described herein. The obtained polyurethane can be present in a variety of forms, for example as a foam, a coating, an adhesive, a casting material, a fibre.

According to some embodiments, the polyurethane is a foam, particularly an open cell foam or a closed cell foam. For example, a semi-rigid integral foam can be prepared by using lignin in solid powder form, which is dispersed into a polyol component (A) according to the invention. In tests, such a foam showed a significantly improved hardness as compared to a reference foam prepared without lignin.

According to other embodiments, the polyurethane is a casting material.

According to yet other embodiments, the polyurethane is a coating.

According to yet other embodiments, the polyurethane is an adhesive, particularly made from a two-component system. The adhesive may contain solvents such as xylol. However, in preferred embodiments, no solvent is present in the adhesive. This is possible due to the advantageous, adhesion-promoting properties of lignin in the compositions according to the invention.

Particularly, a two-component polyurethane adhesive according to the invention comprises a first and a second component. The first component comprises components (i), (iii) and optionally (iv) as defined herein, i.e. at least one polyol (A), at least one lignin compound (C) and optionally at least one additive (D). In certain preferred embodiments, the lignin compound (C) is a lignin in powder form as defined herein. The second component comprises component (ii) as defined herein, i.e. at least one polyisocyanate (B). The ratio of isocyanate reactive hydrogen atoms to isocyanate groups is as defined herein, preferably from 100% to 115%, more preferably from 105% to 110%, e.g. about 106%.

For example, the first component of the two-component PU adhesive comprises components (i), (iii) and (iv), wherein component (i) is selected from the group consisting of castor oil, preferably castor oil from first pressing, castor oil with low water content, castor oil with low acid value, pharmaceutical grade castor oil, blown castor oil, partially dehydrated castor oil, partially hydrogenated castor oil, castor oil esters, e.g. castor oil esters with $C_{1-6}$ alkanols, such as methanol and ethanol, and ricinoleic acid esters with $C_{1-6}$ alkanols or diols selected from 1,2-propanediol, 1,3-propanediol, 1,2-butanediol, 1,3-butanediol, 2,3-butanediol, 1,4-butanediol, ethylene glycol, diethylene glycol, triethylene glycol, pentanediols, hexanediols or diols with even higher molecular weight, more preferably castor oil from first pressing, preferably in an amount of 20-30 wt %, more preferably about 25 wt %, based on the total weight of components (i), (iii) and (iv);

component (iii) is a lignin powder preferably having a maximum humidity of 10%, preferably 5% or less by weight with regard to the total weight of the at least one lignin compound (C), preferably having impurities in an amount of 4% by weight or less, and preferably having a mean particle size (D50) of ≤300 μm, preferably ≤50 μm, more preferably ≤10 μm, wherein the lignin is selected from the group consisting of kraft-lignin, organosolv-lignin, hydrolysis lignin, IL-lignin, preferably kraft-lignin, preferably in an amount of 17.5-22.5 wt %, more preferably about 20 wt %, based on the total weight of components (i), (iii) and (iv); and component (iv) comprises a polyether polyol, e.g. an Arcol® polyether polyol such as Arcol® 1030, preferably in an amount of 5-15 wt %, more preferably about 10 wt %, a filler, e.g. calcium carbonate, preferably in an amount of 30-50 wt %, more preferably about 40 wt %, a molecular sieve, e.g. molecular sieve A3, preferably in an amount of 3-8 wt %, more preferably about 5 wt %, and an amine catalyst, e.g. triethylenediamine, preferably in an amount of 0.05-0.5 wt %, more preferably about 0.1 wt %, each based on the total weight of components (i), (iii) and (iv);

the second component of the two-component PU adhesive comprises component (ii), wherein component (ii) is polymeric MDI, preferably polymeric MDI which particularly has an NCO content of about 31%; and the ratio of isocyanate reactive hydrogen atoms to isocyanate groups is preferably from 105% to 110%, e.g. about 106%.

By using a two-component adhesive described herein, a variety of articles can be produced, where particularly two substrates are bonded together by a cured reaction product of the two-component adhesive. Suitable substrates for application of the two-component adhesive according to the invention are, e.g., metal, plastic, wood, concrete, foam and fiber composites. Each of two substrates to be bonded within the article can be independently selected. It is also possible that the article comprises more than one bonding with the adhesive according to the invention, i.e. more than two substrates are present. In these embodiments, all substrates can be of the same material or all can be of a different material, or, if e.g. three substrates are present, two can be of the same material and one of another material.

In preferred embodiments of the invention, each substrate of the article is independently selected from wood and metal. Exemplary wood substrates according to the invention are beech, birch, maple, oak, nut (e.g. walnut), teak, lime, fir, pine, and chipboard panels. Exemplary metal substrates are steel (e.g. stainless steel or galvanized steel), copper, aluminum and aluminum alloys.

In particular embodiments, the article comprises exactly two substrates bonded together with the inventive two-component adhesive. The two substrates bonded together may be of the same or different materials. According to certain preferred embodiments, both substrates are wood substrates, e.g. beech wood. According to certain embodiments, it is even possible to use humid wood substrates, e.g. beech wood that has been stored in water for at least 7, e.g. 9, days. It has surprisingly been found by the inventors that the two-component adhesive according to the invention can, nonetheless, achieve strong bonding (see Examples).

According to other preferred embodiments, the article comprises two substrates, and both substrates are metal substrates, wherein both substrates are preferably of the same material. In particular, both substrates are made of the same material selected from stainless steel, galvanized steel, copper and aluminum alloys. An exemplary aluminum alloy according to the invention is AlMg3.

Also encompassed by the invention is the use of a reactive polyurethane system as defined herein as an adhesive, particularly a two-component adhesive.

The reactive polyurethane system as defined herein or the two-component adhesive as defined herein may advantageously be used in a method of adhesive bonding, e.g. as defined below.

In a further aspect, the invention relates to the use of a lignin compound (C), which is preferably a lignin present in powder form as defined herein, as an adhesion promoter in a reactive polyurethane system comprising at least one polyol (A) as defined herein and at least one polyisocyanate (B) as defined herein. Advantageously, the polyol (A) interacts with, but does not completely dissolve the lignin compound. Such polyols are, e.g., polyols characterized by HSP with $R_0<R_{AB}<1.4 \cdot R_0$, preferably $R_0<R_{AB}<1.25\ R_0$ as defined above. Particularly, the polyol is a vegetable oil or derivative thereof, more particularly castor oil or a derivative thereof (particularly a transesterification product of the triglycerides or a product of ring opening after epoxidation) as defined herein. The lignin compound (C), particularly a lignin present in powder form, in turn, advantageously is present in particles with a mean diameter (D50) of ≤300 μm, preferably ≤50 μm, more preferably ≤10 μm and a maximum humidity of 10%, preferably 5% by weight or less with regard to the total weight of the lignin compound. Particularly with such polyols and lignin compounds, the inventors have surprisingly found that very homogeneous dispersions can be produced, the viscosities of which are in a range that stabilizes the formulations, but does not impair their processability.

In a further aspect, the invention relates to the use of a lignin compound (C), which is preferably a lignin present in powder form as defined herein, for use as an anti-sedimentation agent in a reactive polyurethane system comprising at least one polyol (A) as defined herein and at least one polyisocyanate (B) as defined herein. Advantageously, the polyol (A) does not completely dissolve the lignin. Such polyols are, e.g., polyols characterized by HSP with $R_0<R_{AB}<1.4 \cdot R_0$, preferably $R_0<R_{AB}<1.25\ R_0$ as defined above. Particularly, the polyol is a vegetable oil or derivative thereof, more particularly castor oil or a derivative thereof (particularly a transesterification product of the triglycerides or a product of ring opening after epoxidation) as defined herein. The lignin, in turn, advantageously is present in particles with a mean diameter (D50) of ≤300 μm, preferably ≤50 μm, more preferably ≤10 μm and a maximum humidity of 10%, preferably 5% by weight or less with regard to the total weight of the lignin. Particularly with such polyols and lignins, the inventors have surprisingly found that when fillers such as calcium carbonate are present in high amounts, a premature sedimentation of the filler is prevented by the lignin compound.

In yet a further aspect, the present invention relates to a method for adhesive bonding a substrate S1 to a substrate S2. According to one principal embodiment of this method, a reactive polyurethane system as defined herein or a two-component polyurethane adhesive as defined herein is applied to one of the substrates, and then the applied reactive polyurethane system or adhesive is contacted with the other substrate within the open time of the reactive polyurethane system or adhesive. According to another principal embodiment of the method, a reactive polyurethane system as defined herein or a two-component polyurethane adhesive as defined herein is applied to both substrates, and then the applied reactive polyurethane systems or adhesives are contacted with one another within the open time of the reactive polyurethane system or adhesive. The substrates S1 and S2 are preferably independently selected from metal, plastic, wood, concrete, foam and a fiber composite, particularly from wood and metal.

According to one preferred embodiment, the method comprises the steps of: (1) applying a reactive polyurethane system as described herein or a two-component polyurethane adhesive as described herein to a substrate S1; and (2) contacting the applied reactive polyurethane system or adhesive with a substrate S2 within the open time of the reactive polyurethane system or adhesive, wherein the substrates S1 and S2 are preferably independently selected from metal, plastic, wood, concrete, foam and a fiber composite. In particular, the substrates are both made of the same material selected from wood and, preferably, metal, e.g. steel.

According to another preferred embodiment, the method comprises the steps of:
- (1') applying a reactive polyurethane system as described herein or a two-component polyurethane adhesive as described herein to a substrate S1 and to a substrate S2;
- (2') contacting the applied reactive polyurethane system or adhesive with one another within the open time of the reactive polyurethane system or adhesive composition, wherein the substrates S1 and S2 are preferably independently selected from metal, plastic, wood, concrete, foam and a fiber composite. In particular, the substrates are both made of the same material selected from wood and, preferably, metal, e.g. steel.

In preferred embodiments, the method of adhesive bonding is carried out with a reactive PU system or two-component PU adhesive as described herein, wherein
- component (i) is selected from the group consisting of castor oil, preferably castor oil from first pressing, castor oil with low water content, castor oil with low acid value, pharmaceutical grade castor oil, blown castor oil, partially dehydrated castor oil, partially hydrogenated castor oil, castor oil esters, e.g. castor oil esters with $C_{1-6}$ alkanols, such as methanol and ethanol, and ricinoleic acid esters with $C_{1-6}$ alkanols or diols selected from 1,2-propanediol, 1,3-propanediol, 1,2-butanediol, 1,3-butanediol, 2,3-butanediol, 1,4-butanediol, ethylene glycol, diethylene glycol, triethylene glycol, pentanediols, hexanediols or diols with even higher molecular weight, more preferably castor oil from first pressing, preferably in an amount of 20-30 wt %, more preferably about 25 wt %, based on the total weight of components (i), (iii) and (iv);
- component (ii) is polymeric MDI, preferably polymeric MDI which particularly has an NCO content of about 31%;
- component (iii) is a lignin powder preferably having a maximum humidity of 10%, preferably 5% by weight or less with regard to the total weight of the at least one lignin compound (C), preferably having impurities in an amount of 4% by weight or less, and preferably having a mean particle size (D50) of ≤300 μm, preferably ≤50 μm, more preferably ≤10 μm, wherein the lignin is selected from the group consisting of kraft-lignin, organosolv-lignin, hydrolysis lignin, IL-lignin, preferably kraft-lignin, preferably in an amount of 17.5-22.5 wt %, more preferably about 20 wt %, based on the total weight of components (i), (iii) and (iv); and
- component (iv) comprises a polyether polyol, e.g. an Arcol® polyether polyol such as Arcol® 1030, preferably in an amount of 5-15 wt %, more preferably about 10 wt %, a filler, e.g. calcium carbonate, preferably in an amount of 30-50 wt %, more preferably about 40 wt %, a molecular sieve, e.g. molecular sieve A3, preferably in an amount of 3-8 wt %, more preferably about 5 wt %, and an amine catalyst, e.g. triethylenediamine, preferably in an amount of 0.05-0.5 wt %, more preferably about 0.1 wt %, each based on the total weight of components (i), (iii) and (iv); and the ratio of isocyanate reactive hydrogen atoms to isocyanate groups is from 105% to 110%, e.g. about 106%.

The invention is further illustrated by the following examples and figures.

LEGENDS TO THE FIGURES

FIG. 1: Fracture pattern of wood (beech). Exemplary and reference adhesive was applied to test specimens. The adhesive was allowed to cure for 7 days at room temperature. Subsequently, the test specimens were stored in water for 9 days at room temperature. Then, a tensile test was performed as described below. Top panel: reference adhesive. Bottom panel: lignin containing adhesive.

Figure 2:
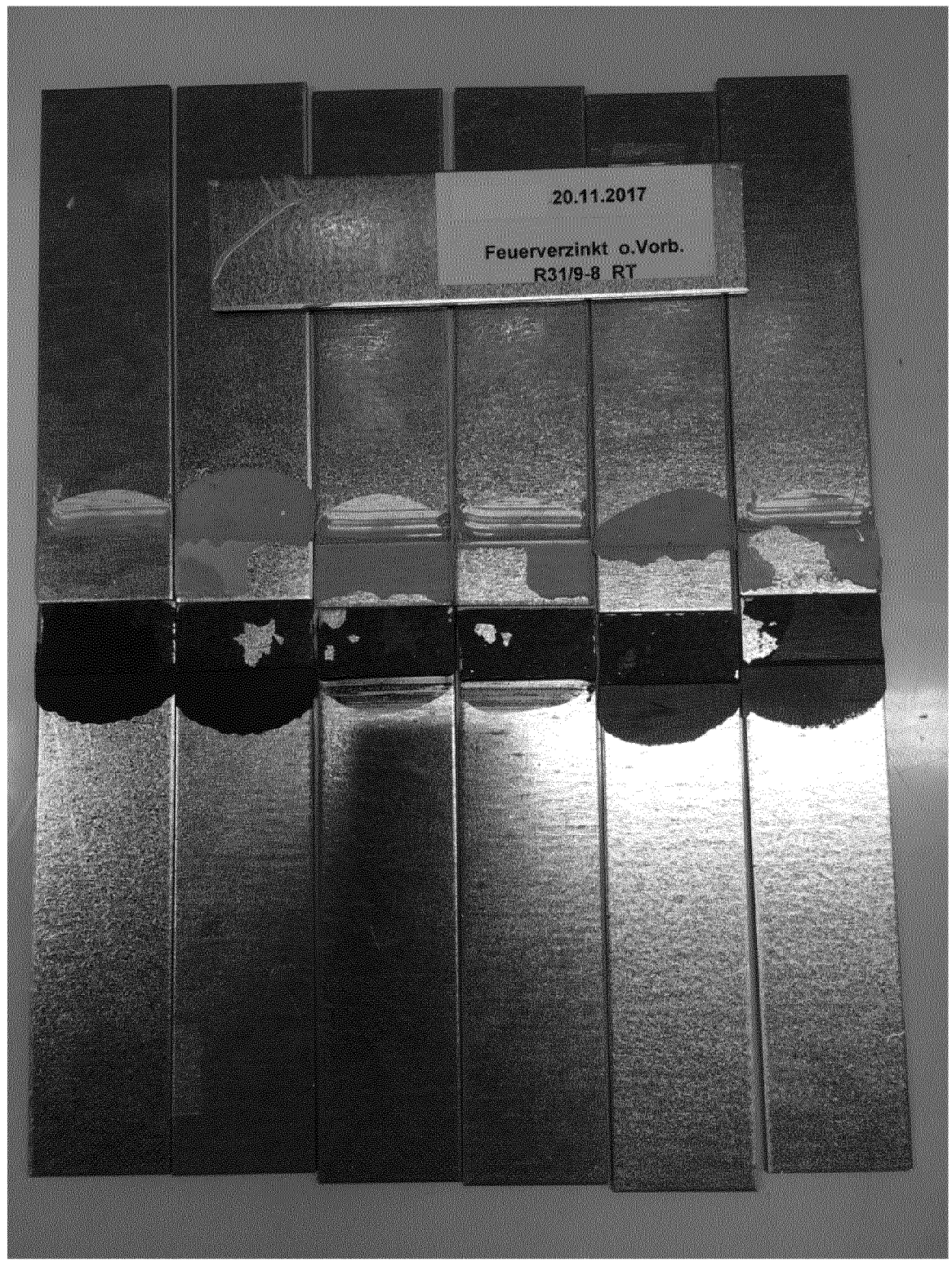

FIG. 2: Fracture pattern of metal (galvanized steel), no treatment prior to application of the exemplary and reference adhesive. The adhesive was allowed to cure at room temperature. After a rest period of 20 days, a tensile test was performed as described below. Top panel: reference adhesive. Bottom panel: lignin containing adhesive.

Figure 3:

FIG. 3: Fracture pattern of metal (stainless steel), no treatment prior to application of the exemplary and reference adhesive. The adhesive was allowed to cure at room temperature. After a rest period of 20 days, a tensile test was performed as described below. Top panel: reference adhesive. Bottom panel: lignin containing adhesive.

Figure 4:
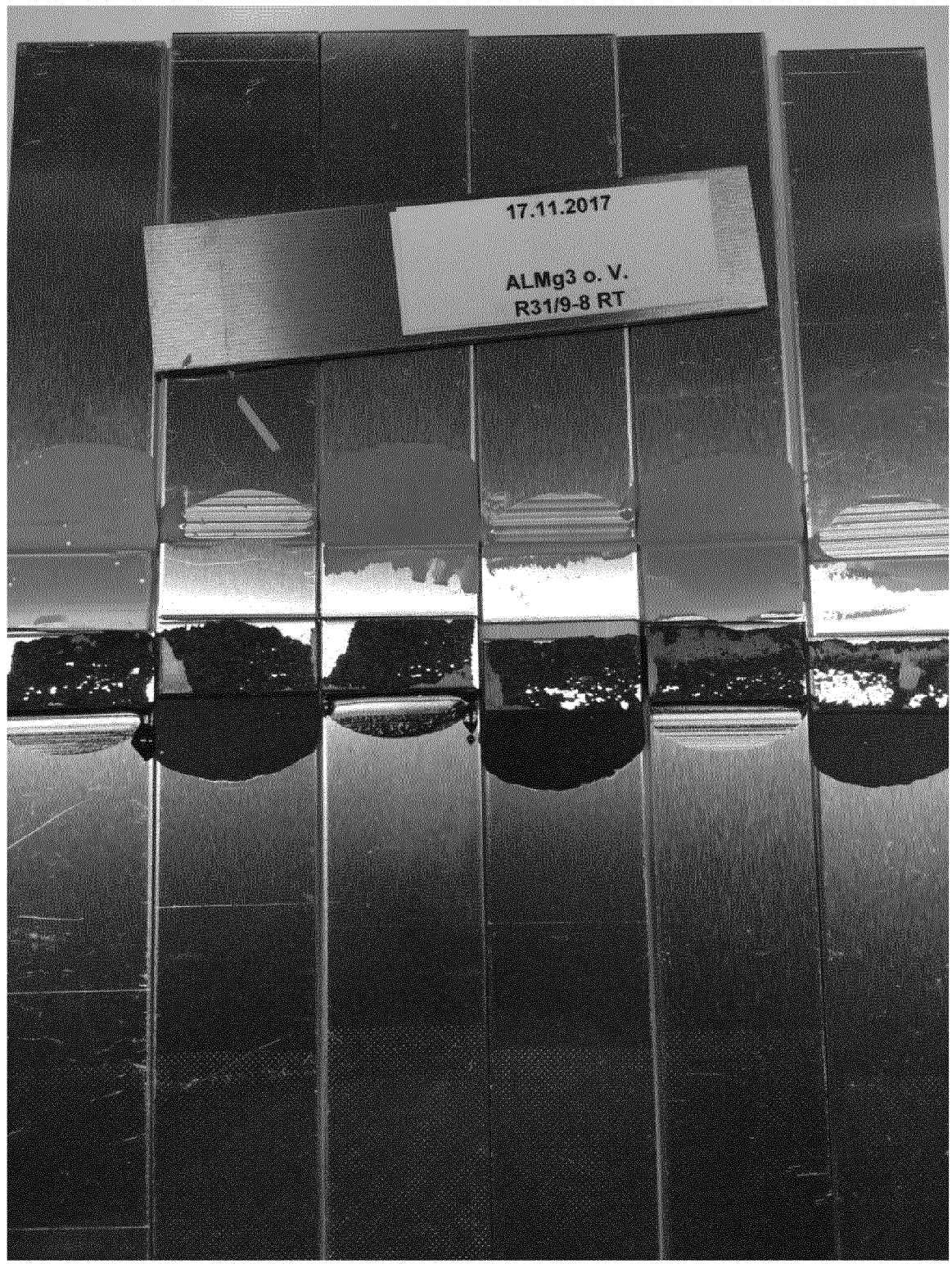

FIG. 4: Fracture pattern of metal (aluminium alloy AlMg3), no treatment prior to application of the exemplary and reference adhesive. The adhesive was allowed to cure at room temperature. After a rest period of 20 days, a tensile test was performed as described below. Top panel: reference adhesive. Bottom panel: lignin containing adhesive.

Figure 5:

FIG. 5: Fracture pattern of concrete. Exemplary and reference adhesive was applied to test specimens. The adhesive was allowed to cure for 7 days at room temperature. Subsequently, the test specimens were stored in water for 9 days at room temperature. Then, the bonded specimens were separated using a chisel. Top panel: reference adhesive. Bottom panel: lignin containing adhesive.

EXAMPLES

Example 1: Two Component Adhesive a) Preparation

Two component adhesive formulations with (Example) and without lignin (Comparison) have been prepared as follows.

TABLE 1

| Component A: | | | |
| --- | --- | --- | --- |
| Compound | hydroxyl value | Example; in wt % | Comparison; in wt % |
| Arcol ® 1030 Polyol (polyether polyol; e.g. Covestro) | 400 | 10 | 10 |
| castor oil 1$^{st}$ pressing | 166 | 24.90 | 24.90 |
| molecular sieve A3 | | 5.00 | 5.00 |
| triethylene diamine | 560 | 0.10 | 0.10 |
| kraft-lignin (Sigma Aldrich) | | 20.00 | 0 |

TABLE 1-continued

| | Component A: | | |
|---|---|---|---|
| Compound | hydroxyl value | Example; in wt % | Comparison; in wt % |
| calcit MX 30 | | 40.00 | 60.00 |
| total | | 100.00 | 100.00 |
| total hydroxyl value | | 81.9 | 81.9 |

It is noted that lignin has free hydroxyl groups and thus, a hydroxyl value may be determined. However, in the context of the invention, it has been proven advantageous not taking into account a hydroxyl value of lignin for calculating the required amount of isocyanate. This approach may be explained by the fact that lignin hydroxyl groups are sterically hindered.

Component B:

Desmodur® 44V20LF (polymeric isocyanate based on MDI; e.g. Covestro) with 31 wt % NCO for both Example and Comparison.

Ratio of isocyanate reactive hydrogen atoms to isocyanate groups: 106% (corresponds to a mixing ratio of Component A to Component B of 100:21).

b) Results at 20° C.

TABLE 2

Results at 20° C.

| | Example | Comparison |
|---|---|---|
| Sample size (A) | 100 | 100 |
| pot life | 30'-35' | 18'-20' |
| Shore D overnight | | 81 |
| Shore D 70° C. | 71 | |
| final hardness Shore D | 81 | 84 |

Example 2: Improvement of Adhesive Properties

Adhesive formulations (Example and Comparison) were prepared as in Example 1.

Thereafter, the adhesive was applied to different substrates (metal, wood, concrete, plastics). After curing of the adhesive, tensile shear strength was determined and fracture patterns analyzed.

Tensile shear strength was determined having regard to DIN EN 1465. Briefly, tensile shear strength of overlap adhesions was determined via applying a shear stress to an overlap splice in single-shear between rigid adherends. The tensile force acts in parallel to the adhesive surface and the main axis of the test specimen. For the experiments, a universal test machine (Zwick Z 020; Zwick GmbH & Co. KG, Ulm, Germany) was used. For joining the specimens, the freshly prepared adhesive was applied to one test specimen. A further test specimen was then laid onto the test specimen with applied adhesive, ensuring proper alignment. The specimens must not be moved until they reach handling stability. Testing is carried out at 23° C., and all test specimens were stored at this temperature at least 24 hours prior to testing. Test speed is selected such that the adhesion is destroyed within 65±20 seconds. The test specimen is aligned in line with the applied force. As results, the tensile shear strength (in MPa=N/mm$^2$) and the average fracture pattern are recorded.

It resulted that the exemplary adhesive composition containing lignin is universally applicable to all substrates. The best results were obtained with metallic substrates and wood. Two things were particularly striking. First, the fracture patterns of the lignin containing adhesive was significantly better than those of the reference adhesive without lignin. Specifically, the lignin containing adhesive very often showed a completely cohesive fracture pattern or fracture pattern with a high proportion of cohesive fracture, whereas in the reference adhesive, cohesive fracture patterns rarely occurred (Tables and FIGS. 1-5).

Example 2.1 Metal Substrates

Experiments were carried out with test specimens where both adherends consisted of the same metal. The specimens were subjected to the above-described procedure, once using the lignin containing adhesive and once the reference adhesive (both according to Example 1). The specimens were pretreated by purification with isopropanol before applying the adhesive and had been stored at room temperature for two weeks. Results are shown in the following Table 3 (see also FIGS. 2, 3 and 4).

TABLE 3

Tensile shear strength and fracture pattern - metal substrates purified with isopropanol before application of the adhesive

| Substrate | tensile shear strength (MPa) lignin containing adhesive | average fracture pattern* | tensile shear strength (MPa) reference adhesive | average fracture pattern* |
|---|---|---|---|---|
| copper | 6.5 | 15% K | 2.5 | 100% A |
| stainless steel | 15.6 | 50% K | 13.9 | 17% K |
| AlMg3 | 15 | 71% K | 10.8 | 100% A |
| galvanized steel | 18.8 | 100% K | 18.6 | 20% K |

*average fracture pattern classified as follows:
K = cohesive fracture in %;
A = adhesive fracture in %

For AlMg3, a further test was carried out with samples pretreated by sandblasting instead of isopropanol purification. There, a tensile shear strength of 15.1 MPa and a 100% K fracture was observed with the lignin containing adhesive, whereas with the reference adhesive, a tensile shear strength of 17.5 MPa and a 20% K fracture was observed.

In a further set of experiments, the same types of metal test specimens were used, but without any pre-treatment prior to application of the adhesive. Results are shown in the following Table 4.

TABLE 4

Tensile shear strength and fracture pattern - metal substrates purified with isopropanol before application of the adhesive

| Substrate | tensile shear strength (MPa) lignin containing adhesive | average fracture pattern* | tensile shear strength (MPa) reference adhesive | average fracture pattern* |
|---|---|---|---|---|
| copper | 12.3 | 35% K | 2.38 | 100% A |
| stainless steel | 16.9 | 62% K | 13.3 | 100% A |
| AlMg3 | 13.9 | 35% K | 10.8 | 100% A |
| galvanized steel | 17.8 | 44% K | 18.6 | 100% A |

*average fracture pattern classified as follows:
K = cohesive fracture in %;
A = adhesive fracture in %

As can be seen from Tables 3 and 4, whether or not test specimens had been purified with isopropanol, the lignin containing adhesive not only showed a better fracture pattern, but also a higher absolute value in tensile shear strength.

Example 2.2 Wood Substrates

Even humid wood test specimens showed ideal properties. It was tested whether bonding could be obtained with humid wood. This condition could be simulated by storing test specimens (beech wood) in water for several days (here: 9 days at room temperature) after applying the adhesive. Otherwise, the procedure was identical to Example 2.1 (no pretreatment with isopropanol). It was again observed that the fracture pattern of the lignin containing adhesive shows a very high cohesive fracture proportion (50% K), whereas the reference adhesive shows a clearly adhesive fracture pattern (100% A), see FIG. 1. Moreover, the absolute values in tensile shear strength are again higher than those of the reference adhesive (5.5 MPa with lignin containing adhesive versus 5.06 MPa with reference adhesive).

A similar effect can be seen with two humid concrete test specimens (stored in water for 9 days at room temperature), which showed 15% K fracture with the lignin containing adhesive versus 100% A fracture with reference adhesive (see FIG. 5). Here, no tensile shear strength could be measured, and the adhesion was destroyed with the help of a chisel.

In conclusion, the exemplary lignin containing adhesive, which had not even been optimized for adhesion properties, could be used on various substrates and showed excellent fracture behaviour. In particular, with metal bondings at room temperature, additional increased tensile shear strength was observed. Also, it could be shown that it is not necessary to degrease the tests specimens before applying the adhesive. Accordingly, time and labor intensive preparation or pretreatment of substrates is, particularly with regard to metal bondings, unnecessary when using lignin containing adhesives according to the invention.

Example 3: Hansen Solubility Parameters

In the following table, Hansen Solubility Parameters for lignin in comparison to various polyols are presented. All values are available from the literature (individual references indicated below the table). All $\delta$ values in $(cal/cm^3)^{1/2}$. For $R_{AB}$, the differences were calculated using equation (I).

TABLE 5

HSP for lignin and various polyols

| | $\delta_{total}$ | $\delta_{Diffusion}$ $(=\delta_d)$ | $\delta_{Polar}$ $(=\delta_p)$ | $\delta_{Hydrogen}$ $(=\delta_h)$ | $\delta_a$ | $R_0$ | $R_{AB}$ | solubility of lignin |
|---|---|---|---|---|---|---|---|---|
| lignin* | 15.6 | 10.8 | 7.0 | 8.8 | 11.2 | 7.1 | | |
| PEG high**** | | 9.4 | 2.0 | 4.8 | | | 7.0 | dissolution |
| PEG low**** | | 7.5 | 1.0 | 4.4 | | | 10.0 | no dissolution |
| soy bean oil polyol hydroxyl value 148***** | | 8.6 | 2.2 | 4.2 | | | 8.0 | swelling |
| castor oil (hydrogenated)** | | 8.3 | | | 4.4 | | 8.4 | swelling |
| castor oil methyl ester*** | | 7.9 | 3.3 | 4.5 | | | 8.2 | swelling |
| DEG* | 14.6 | 7.9 | 7.2 | 10.0 | 12.3 | | 6.0 | dissolution |
| THF* | 9.5 | 8.2 | 2.8 | 3.9 | 4.8 | | 8.3 | swelling |
| hexane* | 7.2 | 7.2 | | | | | 13.3 | no dissolution |

*values from "The Three Dimensional Solubility Parameter and Solvent Diffusion Coefficient - Their Importance In Surface Coating Formulation" by Charles M. Hansen; Copenhagen; Danish Technical Press; 1967
**values from U.S. Pat. No. 6,326,012 B1 (original values $16.96(J/cm^3)^{1/2}$ und $9.01(J/cm^3)^{1/2}$ converted to $(cal/cm^3)^{1/2}$ via division by 2.0455)
***values from Batista, Guirardello, and Krähenbühl; School of Chemical Engineering-UNICAMP, 13083-970 Campinas, S P, Brazil; Energy Fuels, 2013, 27 (12), pp. 97-7509; DOI: 10.1021/ef401690f
****values from "Solubility parameter components of some polyols" by Ryszard Mieczkowski; Institute of Chemistry, N. Copernicus University, 87-100 Toruń, Poland; European Polymer Journal, Volume 27, Issues 4-5, 1991, pp. 377-379
*****values from Zhang C and Kessler M R; ACS Sustainable Chemistry and Engineering 2015, vol. 3, pp. 743-749.

As can be seen from the last column of Table 5, the desired swelling of lignin in polyol is observed, when using vegetable oils or derivatives thereof. There, the ratio of $R_{AB}$ to $R_0$ are in the range of $R_0 < R_{AB} < 1.25 R_0$.

Example 4: Lignin Containing Polyol Dispersions

The homogeneity of Component A of the two component adhesive according to the invention (see above, Example 1) can be examined via storage stability tests. Formulations that are not storage-stable separate over time. Often, the filler settles as a rigid layer, which cannot be re-dispersed. In the lignin containing formulation of Component A according to the invention, even after storage for three months at room temperature, no separation of constituents or settling of a rigid filler layer is observed. Only some polyol floats, but can easily be re-dispersed without any effect on the quality of the formulation.

Example 5: Lignin Degradation Product Containing Polyol

Wood chips (spruce) were incubated at 150° C. for 4 hours in a ionic liquid and in the presence of organic co-solvent and polyethylene glycol (PEG). After cooling down the mixture and removal of (solid) cellulose, a liquid, homogeneous reaction product of dark brown color was obtained. This reaction product is based on PEG, lignin (in solution) and hemicellulose (in solution) and can be used as a polyol component for the preparation of polyurethanes.

Example 6: Ester Polyols from Lignin Degradation Products

Guaiacol, obtained from degradation of lignin, was reacted with glycidol, either in the presence of amine catalyst in ethanol at 84° C., or in the presence of sodium hydroxide at 90° C.

The resulting guaiacol-glycerolether (G-Glyc) was reacted with adipic acid (Adip) alone or with diethylene glycol (DEG) and adipic acid (Adip). The following exemplary ester polyols were obtained (Table 6).

TABLE 6

Ester polyols from guaiacol

| polyol batch | monomers | conc. G-Glyc | hydroxyl value (mg KOH/g) | viscosity (mPa · s at 25° C.) | acid number (mg KOH/g) |
|---|---|---|---|---|---|
| F5 | G-Glyc/Adip | 66% | 97 | 25990 | 8.2 |
| F8 | G-Glyc/Adip | 73% | 205 | 10940 | 5.3 |
| F7 | G-Glyc/DEG/Adip | 38% | 563 | 1460 | 2.3 |
| F10 | G-Glyc/DEG/Adip | 24% | 404 | 379 | 2.3 |

The invention is further characterized by the following items.

Item 1. Reactive polyurethane-system comprising
(i) at least one polyol (A),
(ii) at least one polyisocyanate (B), and
(iii) at least one lignin compound (C).

Item 2. Reactive polyurethane-system according to item 1, wherein the at least one polyol (A) is a hydrophobic polyol.

Item 3. Reactive polyurethane-system according to item 1 or 2, wherein the at least one polyol (A) is a polyester-based polyol, particularly a hydrophobic polyester-based polyol.

Item 4. Reactive polyurethane-system according to item 1 or 2, wherein the at least one polyol (A) is an oil, particularly a natural oil, more particularly a vegetable oil, or a derivative of an oil, particularly a derivative of a vegetable oil.

Item 5. Reactive polyurethane-system according to item 4, wherein the oil is an animal oil, e.g. fish oil, or a vegetable oil selected from the group consisting of castor oil, soybean oil, safflower oil, peanut oil, rapeseed oil, sunflower oil, palm oil, linseed oil, olive oil, tung oil, corn oil, canola oil, sesame oil and cottonseed oil, or a blend of at least two oils.

Item 6. Reactive polyurethane-system according to item 4 or 5, wherein the derivative of an oil is a reaction product obtainable by subjecting an oil, particularly a vegetable oil, to
(i) transesterification, such as a reaction product with any one of ethylene glycol, diethylene glycol, triethylene glycol, tetraethylene glycol, polyethylene glycol, propylene glycol, dipropylene glycol, tripropylene glycol, tetrapropylene glycol, polypropylene glycol, glycerol, pentaerythriol, di-pentaerythriol, tri-pentaerythriol, trimethyolpropane (TMP), sorbitol, isosorbide, cyclohexanediol, fatty dialcohols, propanediols, butanediols, pentanediols, hexanediols, cyclohexanediols, di- and polyamines like ethylene diamine, neopentylamine, diaminohexane, diethylene triamine, triethylene tetramine, aminoalcohols like ethanolamine, diethanolamine, triethanolamine,
(ii) epoxidation and subsequent ring opening,
(iii) amidation,
(iv) hydroformylation and subsequent reduction,
(v) ozonolysis and subsequent reduction,
(vi) thiol-ene addition,
(vii) epoxides hydrogenation,
(viii) ester reduction,
(ix) diels alder cyclization,
(x) double bonds oxidation to peroxides and reduction to alcohols,
(xi) electrophilic additions of formaldehyde, metathesis and reduction,
(xii) or a combination of two or more of the above.

Item 7. Reactive polyurethane-system according to any one of the preceding items, wherein the at least one polyol (A) comprises at least 12 consecutive carbon atoms per molecule, wherein the ratio of carbon atoms to oxygen atoms per molecule is at least about 4, e.g. about 6, preferably 4-8.

Item 8. Reactive polyurethane-system according to any one of the preceding items, wherein the at least one polyol (A) is selected from the group consisting of castor oil, preferably castor oil from first pressing, castor oil with low water content, castor oil with low acid value, pharmaceutical grade castor oil, blown castor oil, partially dehydrated castor oil, partially hydrogenated castor oil, castor oil esters, e.g. castor oil esters with $C_{1-6}$ alkanols, such as methanol and ethanol, and ricinoleic acid esters with $C_{1-6}$ alkanols or typical diols, such as 1,2-propanediol, 1,3-propanediol, 1,2-butanediol, 1,3-butanediol, 2,3-butanediol, 1,4-butanediol, ethylene glycol, diethylene glycol, triethylene glycol, pentanediols, hexanediols or diols with even higher molecular weight.

Item 9. Reactive polyurethane-system according to any one of the preceding items, further comprising
(iv) at least one additive (D).

Item 10. Reactive polyurethane-system according to item 9, wherein the at least one additive (D) is selected from polyether polyol, filler, foaming agent, abrasion reducer, amine catalyst, molecular sieve, antioxidant, flame retardant, antistatic agent, cell opener, dye, crosslinker, surfactant, softening agent, polyamine, or any combination thereof.

Item 11. Reactive polyurethane-system according to any one of the preceding items, wherein the at least one polyisocyanate (B) is selected from the group consisting of an aromatic or aliphatic polyisocyanates.

Item 12. Reactive polyurethane-system according to any one of the preceding items, wherein the at least one polyisocyanate (B) is an aromatic polyisocyanate selected from monomeric methylenedi(phenylisocyanate) (MDI), polymeric MDI and toluylene diisocyanate (TDI), preferably polymeric MDI.

Item 13. Reactive polyurethane-system according to any one of items 1-11, wherein the at least one polyisocyanate (B) is an aliphatic polyisocyanate selected from methylenedi (cyclohexyl isocyanate) (HMDI), isophorone diisocyanate (IPDI), pentamethylene diisocyanate (PDI) and hexamethylene diisocyanate (HDI).

Item 14. Reactive polyurethane-system according to any one of the preceding items, wherein the NCO content of component (ii) is 30-35%, preferably 30-33%, more preferably 30.5-31.5%.

Item 15. Reactive polyurethane-system according to any one of the preceding items, wherein component (ii) is polymeric MDI, preferably polymeric MDI with an NCO content of about 31%.

Item 16. Reactive polyurethane-system according to any one of the preceding items, wherein the at least one lignin compound (C) is a lignin or a lignin derivative.

Item 17. Reactive polyurethane-system according to any one of the preceding items, wherein the at least one lignin compound (C) is a lignin derivative selected from modified lignin and a lignin degradation product.

Item 18. Reactive polyurethane-system according to item 17, wherein the modified lignin is an organically modified lignin, particularly lignin modified by reaction of at least a part of its hydroxyl groups with activated carboxylic acids, isocyanate or isocyanate prepolymers, or by reaction of at least a part of its carboxyl groups with activated amines or alcohols.

Item 19. Reactive polyurethane-system according to item 17, wherein the lignin degradation product is selected from lignin monomers, e.g. guaiacol, syringol, catechol, and base-catalyzed degradation (BCD) lignin oligomers, each of which is optionally organically modified, e.g. by epoxidation/ring opening.

Item 20. Reactive polyurethane-system according to item 19, wherein the organically modified lignin degradation product is a 3-aryloxy-1,2-propane-diol, wherein aryl is phenyl which is optionally independently substituted with 1, 2 or 3 $C_1$-$C_3$ alkyl, $C_1$-$C_3$ alkoxy, $C_2$-$C_3$ alkenyl or hydroxyl groups.

Item 21. Reactive polyurethane-system according to any one of items 1-16, wherein the at least one lignin compound (C) is a lignin present in powder form.

Item 22. Reactive polyurethane-system according to item 21, wherein the lignin has a maximum humidity of 10%, preferably 5% or less by weight with regard to the total weight of the at least one lignin compound (C).

Item 23. Reactive polyurethane-system according to item 21 or 22, wherein the lignin has a mean particle size (D50) of ≤300 μm, preferably ≤50 μm, more preferably ≤10 μm.

Item 24. Reactive polyurethane-system according to any one of items 21-23, wherein the lignin is selected from the group consisting of kraft-lignin, organosolv-lignin, hydrolysis lignin and IL-lignin, or any combination thereof.

Item 25. Reactive polyurethane-system according to any one of the preceding items, wherein the lignin compound (C) has not been subjected to chemical pretreatment, e.g. with isocyanate.

Item 26. Reactive polyurethane-system according to any one of the preceding items, wherein the solubility of component (iii) in component (i) is characterized by the Hansen Solubility Parameters (HSP) distance ($R_{AB}$) in Hansen space between component (i) and component (iii) being greater than the interaction radius ($R_0$) of component (iii).

Item 27. Reactive polyurethane-system according to item 26, wherein $R_0 < R_{AB} < 1.4 \cdot R_0$, preferably $R_0 < R_{AB} < 1.25 \cdot R_0$.

Item 28. Reactive polyurethane-system according to item 26 or 27, wherein $R_{AB}$ is determined according to equation (I)

$$(R_{AB})^2 = 4(\delta_{d2}-\delta_{d1})^2 + (\delta_{p2}-\delta_{p1})^2 + (\delta_{h2}-\delta_{h1})^2 \qquad (I)$$

wherein $\delta_d$ represents the effects of the dispersion forces (d), $\delta_p$ represents the effects of the polar forces (p), and $\delta_h$ represents the effects of the hydrogen bonding forces (h), and wherein $\delta_{x2}$ with x=d, p or h is the respective solvent coordinate and $\delta_{x1}$ with x=d, p or h is the respective center point of the solute sphere.

Item 29. Reactive polyurethane-system according to any one of the preceding items, wherein component (i) is present in an amount of 15-35 wt %, preferably 20-30 wt %, more preferably about 25 wt %, based on the total weight of components (i), (iii) and (iv).

Item 30. Reactive polyurethane-system according to any one of the preceding items, wherein component (iv) is present in an amount of 40-70 wt %, preferably about 55 wt %, based on the total weight of components (i), (iii) and (iv).

Item 31. Reactive polyurethane-system according to any one of the preceding items, wherein the component (iv) comprises a polyether polyol, e.g. in an amount of 5-15 wt %, preferably about 10 wt %, a filler, e.g. in an amount of 30-50 wt %, preferably about 40 wt %, a molecular sieve, e.g. in an amount of 3-8 wt %, preferably about 5 wt %, and/or an amine catalyst, e.g. in an amount of 0.05-0.5 wt %, preferably about 0.1 wt %, each based on the total weight of components (i), (iii) and (iv).

Item 32. Reactive polyurethane-system according to any one of the preceding items, wherein the ratio of isocyanate reactive hydrogen atoms to isocyanate groups is from 100% to 115%, preferably from 105% to 110%.

Item 33. Process for producing a polyurethane (PU) from a reactive polyurethane-system according to any of items 1-32, comprising the steps of
(1) dispersing component (iii) and optionally component (iv) in component (i),
(2) mixing component (ii) with the dispersion obtained in step (1),
(3) optionally loading the mixture obtained in step (2) with gas, such as air,
(4) pouring the mixture obtained in step (2) or (3) onto a surface, optionally at elevated temperature,
(5) optionally postcuring the mixture obtained in step (4), and
(6) optionally shaping the product obtained after step (4) or (5) into the desired dimensions.

Item 34. Process according to item 33, wherein only steps (1), (2) and (4) are performed.

Item 35. Process according to items 33 or 34, wherein component (iii) is a lignin, wherein the mean particle size (D50) after dispersing component (iii) in component (i) is between 1 and 200 μm.

Item 36. Polyurethane (PU) obtainable by a process according to any one of items 33-35.

Item 37. Polyurethane (PU) according to item 36, which is a foam, particularly an open or closed cell foam, particularly a closed cell foam, or a casting material.

Item 38. Polyurethane (PU) according to item 36, which is a coating.

Item 39. Polyurethane (PU) according to item 36, which is an adhesive.

Item 40. Two-component polyurethane adhesive, comprising a first component comprising
components (i), (iii) and optionally (iv) as defined in any one of items 1-10 and 16-31 and a second component comprising component (ii) as defined in any one of items 1 and 11-15, wherein the ratio of isocyanate reactive hydrogen atoms to isocyanate groups is as defined in item 32.

Item 41. Article comprising at least two substrates, particularly two substrates, bonded together by cured reaction products of the two-component polyurethane adhesive according to item 40.

Item 42. Article according to item 41, wherein each substrate is independently selected from metal, plastic, wood, concrete, foam and a fiber composite, particularly from wood and metal.

Item 43. Article according to item 41 or 42, wherein all substrates are of the same material.

Item 44. Article according to any one of items 41-43 comprising two substrates, wherein both substrates are metal substrates selected from stainless steel, galvanized steel, copper and aluminum alloys such as AlMg3.

Item 45. Use of a lignin compound (C) as defined in any one of items 16-25, particularly as defined in any one of items 21-25, as an adhesion promoter in a reactive polyurethane system comprising at least one polyol (A) and at least one isocyanate (B).

Item 46. Use of a lignin compound (C) as defined in any one of items 16-25, particularly as defined in any one of items 21-25, as an anti-sedimentation agent in a reactive polyurethane system comprising at least one polyol (A) and at least one isocyanate (B).

Item 47. Use of a lignin compound (C) according to item 45 or 46, wherein the at least one polyol (A) is defined as in any one of items 2-8, and the at least one polyisocyanate (B) is defined as in any one of items 11-13.

Item 48. Use of a reactive polyurethane-system according to any of items 1-32 as an adhesive.

Item 49. Use of a reactive polyurethane-system according to any of items 1-32 or a two-component polyurethane adhesive according to item 40 in a method of adhesive bonding.

Item 50. Method for adhesive bonding of a substrate S1 to a substrate S2, comprising the steps of:
(1) applying a reactive polyurethane system according to any one of items 1-32 or a two-component polyurethane adhesive according to item 40 to a substrate S1;
(2) contacting the applied reactive polyurethane system or adhesive with a substrate S2 within the open time of the reactive polyurethane system or adhesive;
or
(1') applying a reactive polyurethane system according to any one of items 1-32 or a two-component polyurethane adhesive according to item 40 to a substrate S1 and to a substrate S2;
(2') contacting the applied reactive polyurethane system or adhesive with one another within the open time of the of the reactive polyurethane system or adhesive;
wherein the substrates S1 and S2 are preferably independently selected from metal, plastic, wood, concrete, foam and a fiber composite, particularly from wood and metal.

Item 51. Method according to item 50, wherein the surfaces of substrates S1 and S2 are not pretreated before applying the reactive polyurethane system or adhesive.

Item 52. Method according to item 50 or 51, wherein the substrates S1 and S2 both made of the same material and are selected from wood and concrete, and wherein the substrates S1 and S2 are stored in water prior to applying the reactive polyurethane system or adhesive.

The invention claimed is:

1. A reactive polyurethane-system comprising:
(i) at least one polyol,
(ii) at least one polyisocyanate, and
(iii) at least one lignin compound, and
(iv) optionally at least one additive,
wherein the at least one polyol comprises at least 12 consecutive carbon atoms per molecule, wherein the ratio of carbon atoms to oxygen atoms per molecule is at least 4, and wherein the at least one lignin compound comprises a lignin in the form of a powder and has a mean particle size (D50) of ≤300 μm;
wherein the at least one polyol is present in an amount of 15-35 wt % based on the total weight of components (i), (iii), and (iv) if present; and
wherein the at least one lignin compound is present in an amount of 10-25 wt % based on the total weight of components (i), (iii), and (iv) if present.

2. The reactive polyurethane-system according to claim 1, wherein the at least one polyol is a hydrophobic polyol.

3. The reactive polyurethane-system according to claim 1, wherein the at least one additive is present in an amount of 40-70 wt % based on the total weight of components (i), (iii), and (iv).

4. The reactive polyurethane-system according to claim 3, wherein the at least one additive is selected from the group consisting of polyether polyol, filler, foaming agent, abrasion reducer, amine catalyst, molecular sieve, antioxidant, flame retardant, antistatic agent, cell opener, dye, crosslinker, surfactant, softening agent, polyamine, and any combination thereof.

5. The reactive polyurethane-system according to claim 1, wherein the at least one polyisocyanate is selected from the group consisting of an aromatic and aliphatic polyisocyanate.

6. The reactive polyurethane-system according to claim 1, wherein an NCO content of component (ii) is 30-35%.

7. The reactive polyurethane-system according to claim 1, wherein the lignin is a lignin derivative selected from a lignin modified by a reaction of at least a part of the lignin's hydroxyl groups with activated carboxylic acids, isocyanate or isocyanate prepolymers, or by a reaction of at least a part of the lignin's carboxyl groups with activated amines or alcohols.

8. The reactive polyurethane-system according to claim 1, wherein the solubility of component (iii) in component (i) is characterized by the Hansen Solubility Parameters (HSP) and wherein a distance ($R_{AB}$) in Hansen space between component (i) and component (iii) is being greater than the interaction radius ($R_0$) of component (iii).

9. The reactive polyurethane-system according to claim 1, wherein a ratio of isocyanate reactive hydrogen atoms to isocyanate groups is from 100% to 115%, or from 105% to 110%.

10. The reactive polyurethane system of claim 1, wherein the at least one lignin compound is an adhesion promoter or an anti-sedimentation agent.

11. The reactive polyurethane-system according to claim 1, wherein the reactive polyurethane system is an adhesive.

* * * * *